US008261206B2

(12) United States Patent
Bennett et al.

(10) Patent No.: US 8,261,206 B2
(45) Date of Patent: Sep. 4, 2012

(54) DIGITAL MAP HAVING USER-DEFINED ZOOM AREAS

(75) Inventors: Valerie Monk Bennett, Macon, NC (US); Joseph Robert Cyrus, Jr., Cary, NC (US); Mohit Jain, Durham, NC (US); Ethan Kary Merrill, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/394,246

(22) Filed: Feb. 27, 2009

(65) Prior Publication Data

US 2010/0223577 A1    Sep. 2, 2010

(51) Int. Cl.
*G06F 3/048* (2006.01)
*G06F 3/01* (2006.01)

(52) U.S. Cl. ........ 715/800; 715/764; 715/781; 715/788; 715/803; 715/855

(58) Field of Classification Search ................. 715/800, 715/764, 781, 788, 803, 855; 701/207–208
See application file for complete search history.

(56) References Cited

U.S. PATENT DOCUMENTS

| | | | |
|---|---|---|---|
| 4,751,507 A | | 6/1988 | Hama et al. |
| 6,321,158 B1 * | 11/2001 | DeLorme et al. ............. 701/201 |
| 2004/0162669 A1 * | 8/2004 | Nagamasa ..................... 701/208 |
| 2006/0136090 A1 * | 6/2006 | Koromyslov et al. ........ 700/200 |
| 2006/0139375 A1 * | 6/2006 | Rasmussen et al. .......... 345/641 |
| 2007/0018984 A1 * | 1/2007 | Sauvageau ..................... 345/440 |
| 2007/0096945 A1 * | 5/2007 | Rasmussen et al. ........ 340/995.1 |
| 2008/0308732 A1 * | 12/2008 | Warnke et al. ................ 250/330 |

OTHER PUBLICATIONS

Web site of the CA Department of Transportation http://www.dot.ca.gov/hq/traffops/trucks/routes/restrict-list.htm, snapshot of Jan. 25, 2008 downloaded from www.archive.org using the Wayback machine on Mar. 29, 2011.*
Web site of the CA Department of Transportation http://www.dot.ca.gov/hq/traffops/trucks/routes/restrict-list.htm, snapshot of Jan. 25, 2008 downloaded from www.archive.org using the Wayback machine on Nov. 19, 2011.*
"Yahoo! Maps, Driving Directions, and Traffic" http://maps.yahoo.com, 2011.
Maps, Ask.Com, http://www.ask.com/maps, 2011.
V. Lombardi, "Map Zoom by-Icon Design" Apr. 21, 2002, http://www.noisebetweenstations.com/personal/designs/map_zoom-by-icon/.

* cited by examiner

*Primary Examiner* — Mark Rinehart
*Assistant Examiner* — Claudia Dragoescu
(74) *Attorney, Agent, or Firm* — Law Office of Jim Boice

(57) ABSTRACT

Computer hardware logic displays a computer-generated geographic map on a video display through the use of a receiving logic and a zooming logic. The receiving ic detects an input signal for initiating a map zoning mode for an initial computer-generated geographic map. This map zoning mode prevents zooming of the entire initial computer-generated geographic map. The zooming logic zooms a user-selected area on the initial computer-generated geographic map, thus generating a zoom window that displays and overlays an enlarged view of the user-selected area over the initial computer-generated geographic map.

9 Claims, 5 Drawing Sheets

DIGITAL MAP HAVING USER-DEFINED ZOOM AREAS

BACKGROUND OF THE INVENTION

1. Technical Field

The present disclosure relates to the field of computers, and specifically to computer-generated maps. Still more particularly, the present disclosure relates to persistently modifying a display of a computer-generated map.

2. Description of the Related Art

Digital maps are useful tools for physical land navigation. Such maps are found on websites (using Internet mapping software) and dedicated electronic devices, including cell phones, Global Positioning System (GPS) navigational devices, etc. While useful in providing either high-level or detailed views of a particular geographical area, such devices are unable to provide dynamic and user-controlled multiple levels of detail. That is, current maps allow a user to "zoom" in or out to different levels of resolution for an entire map, but do not afford a user the ability to display one or more "zoomed" areas, particularly areas that can be overlaid on top of the main map.

SUMMARY OF THE INVENTION

To address the above described issue, a digital map that affords user-controlled "zooming" of one or more areas of the digital map is presented. A processor detects that a user has selected a specific point or area on a main displayed digital map. In response to the user dragging a clicked cursor from that specific point, additional zoomed detail of the selected point or area is displayed on top of the main displayed digital map.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
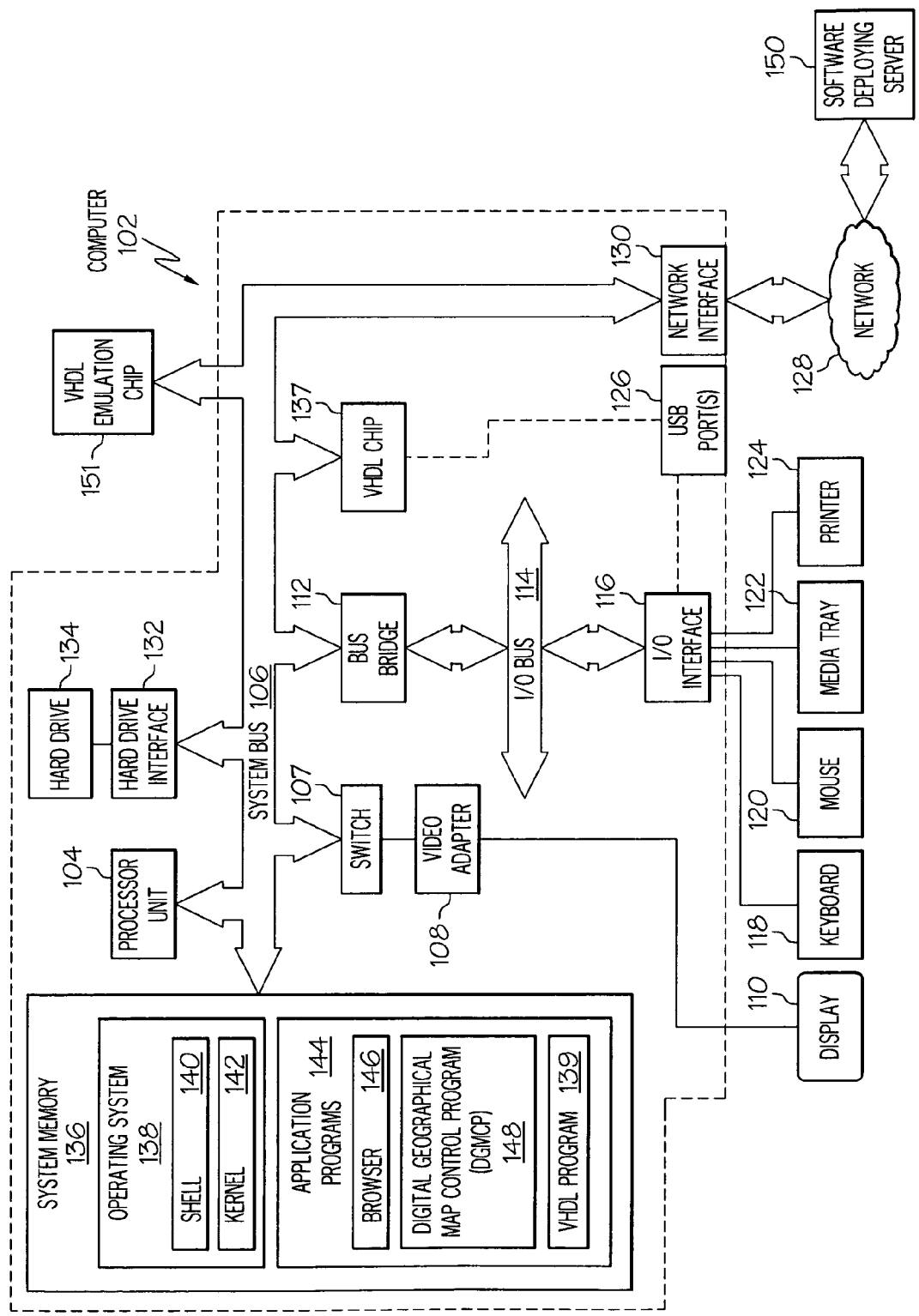
FIG. 1 depicts an exemplary computer in which the present invention may be implemented.

With reference now to the figures, and in particular to FIG. 1, there is depicted a block diagram of an exemplary computer 102, which may be utilized by the present invention. Note that some or all of the exemplary architecture shown for computer 102 may be utilized by software deploying server 150.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., Digital Geographical Map Control Program—DGMCP 148 described below) that support the processes described herein. This switching causes a substantive transformation of the computer 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), USB port(s) 126. While the format of the ports connected to I/O interface 116 may be any known to those skilled in the art of computer architecture, in a preferred embodiment some or all of these ports are Universal Serial Bus (USB) ports.

As depicted, computer 102 is able to communicate with a software deploying server 150 via network 128 using a network interface 130. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Digital Geographical Map Control Program (DGMCP) 148. DGMCP 148 includes code for implementing the processes described below, including those described in FIGS. 2-5. In one embodiment, computer 102 is able to download DGMCP 148 from software deploying server 150, including in an on-demand basis. Note further that, in one embodiment of the present invention, software deploying server 150 performs all of the functions associated with the present invention (including execution of DGMCP 148), thus freeing computer 102 from having to use its own internal computing resources to execute DGMCP 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from DGMCP 148 causes VHDL program 139 to configure VHDL chip 137, which may be an FPGA, ASIC, etc. This programming of VHDL chip 137 causes a substantial transformation of the architecture of computer 102, wherein (assuming that USB port(s) 126 are NOT coupled to I/O interface 116) USB port(s) 126 are now selectively coupled to system bus 106 via VHDL chip 137.

In another embodiment of the present invention, execution of instructions from DGMCP 148 results in a utilization of VHDL program 139 to program a VHDL emulation chip 151. VHDL emulation chip 151 may incorporate a similar architecture as described above for VHDL chip 137. Once DGMCP 148 and VHDL program 139 program VHDL emulation chip 151, VHDL emulation chip 151 performs, as hardware, some or all functions described by one or more executions of some or all of the instructions found in DGMCP 148. That is, the VHDL emulation chip 151 is a hardware emulation of some or all of the software instructions found in DGMCP 148. In one embodiment, VHDL emulation chip 151 is a Programmable Read Only Memory (PROM) that, once burned in accordance with instructions from DGMCP 148 and VHDL program 139, is permanently transformed into a new circuitry that performs the functions needed to generate digital map 202 as shown below in FIGS. 2-5. Thus, VHDL emulation chip 151 is also properly viewed as a machine that is under the control of computer 102. Note that while VHDL emulation chip 151 is depicted as being a different entity that is separate from computer 102, in another embodiment VHDL emulation chip 151 may be an integral part of computer 102.

In one embodiment of the present invention, the hardware displayed in FIG. 1 is used as computer hardware logic for displaying a computer-generated geographic map on a video display (e.g., display 110). In one embodiment, a combination of I/O interface 116, mouse 120, and processor 104 function as a receiving logic for detecting, under the control of DGMCP 148, an input signal for initiating a map zoning mode for an initial computer-generated geographic map, wherein the map zoning mode prevents zooming of the initial computer-generated geographic map. Similarly, the combination of I/O interface 116, mouse 120, and processor 104 function as a zooming logic for zooming a user-selected area on the initial computer-generated geographic map, wherein said zooming generates a zoom window that displays and overlays an enlarged view of the user-selected area over the initial computer-generated geographic map.

In one embodiment, multiple user-selected areas are zoomed, displayed and overlaid over the initial computer-generated geographic map as multiple zoom windows. In this embodiment, a combination of processor 104, video adapter 108, and display 110 function as a persistence logic for persistently and simultaneously displaying all of the multiple zoom windows over the initial computer-generated geographic map.

In one embodiment, a combination of I/O interface 116, mouse 120, video adapter 108, and processor 104 function as a selective zooming logic for selectively zooming each of the multiple zoom windows to different zoom levels.

In one embodiment, the user-selected area is a singular point on the initial computer-generated geographic map. In this embodiment, a combination of I/O interface 116, mouse 120, video adapter 108, and processor 104 function as a cursor movement detection logic, wherein the cursor movement detection logic detects a distance between a clicked user-selected singular point on the initial computer-generated geographic map and a final resting position of a mouse cursor, wherein the distance automatically determines a size of the zoom window.

In one embodiment, the combination of I/O interface 116, mouse 120, video adapter 108, and processor 104 function as a zoom window repositioning logic, wherein the zoom window repositioning logic detects a pre-defined type of information displayed on the initial computer-generated geographic map and automatically repositions the zoom window such that the zoom window does not overlay and obscure the pre-defined type of information displayed on the initial computer-generated geographic map. The pre-defined type of information may be names of intersecting roads, a city name, or any other pre-defined (by a user or by software logic) point of interest on the map.

In one embodiment, a combination of I/O interface 116, mouse 120, video adapter 108, processor 104 and data from DGMCP 148 function as a zoom window visual encoding logic, wherein the zoom window visual encoding logic alters a physical appearance of the zoom window in accordance with a unique condition of roads depicted within the zoom window. These unique conditions include, but are not limited to, a prohibition against transporting hazardous materials on the roads depicted within the zoom window.

In one embodiment, a combination of I/O interface 116, mouse 120, video adapter 108, processor 104, and data from DGMCP 148 function as function as a text box display logic, wherein the text box display logic causes the presentation of a text box to display text information about businesses located at a street intersection depicted within the zoom window.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
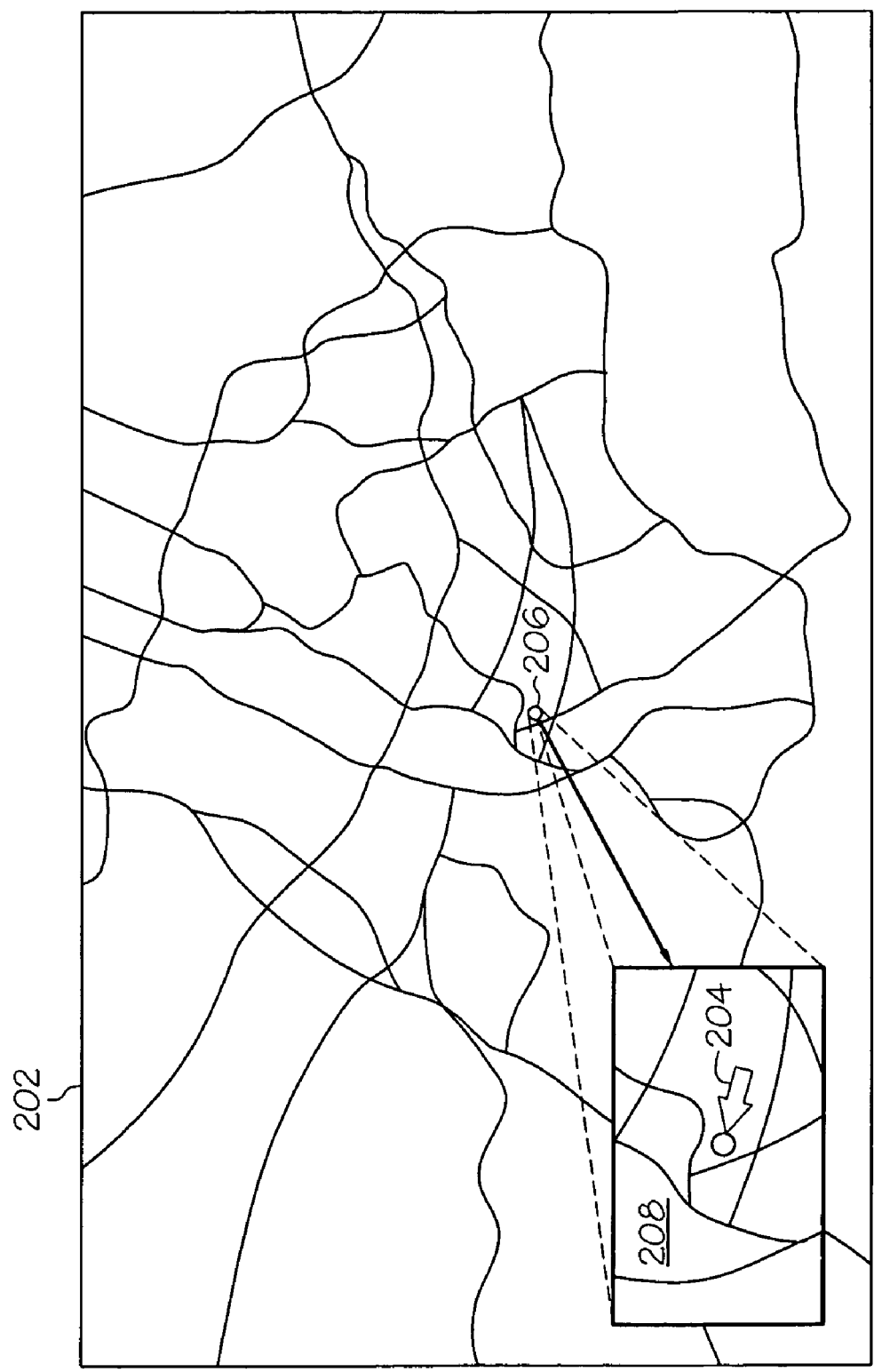
FIG. 2 illustrates an initial digital map having an overlaying zoom window that has been derived from a user-selected zoom point.
Figure 3:
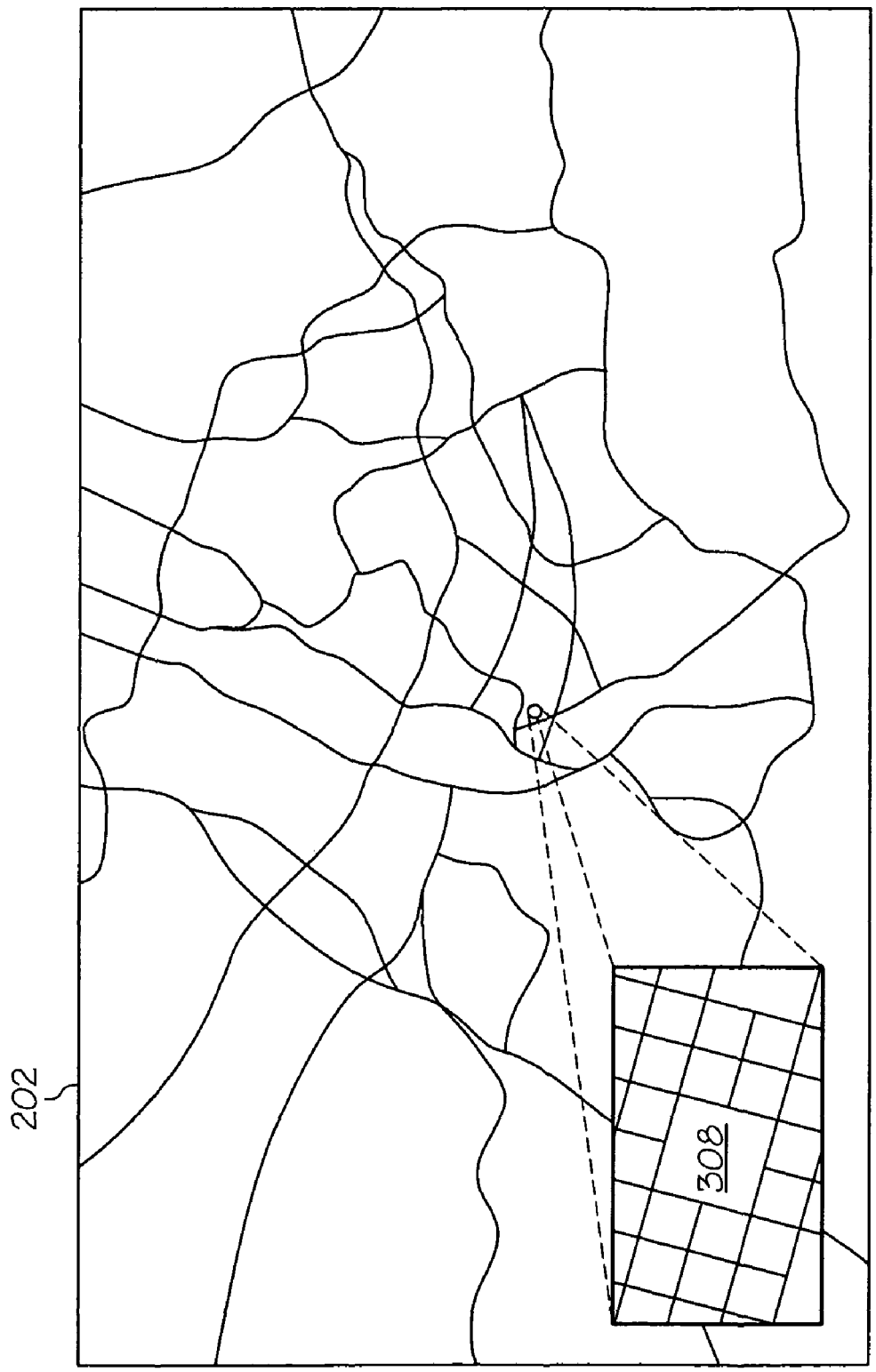
FIG. 3 depicts the overlaying zoom window populated with zoom detail of the user-selected zoom point.

With reference now to FIG. 2, an exemplary digital map 202 (an "initial computer-generated geographic map") is presented in accordance with the present invention. A user has clicked a cursor 204 at a particular point 206 (or zone) on the main digital map 202. By dragging the cursor 204 away from the user-selected point/zone 206, two things occur simultaneously, depending on how far the cursor 204 is dragged. The first event that occurs is that a predefined section (per the user-selected point/zone 206) of the digital map 202 is overlaid over the digital map 202 as a zoom window 208, which presents a detailed view of the point/zone 206. The second event that occurs is that the zoom window 208 expands in proportion to how far the cursor 204 is dragged away from the user-selected point/zone 206. That is, the farther away from the original point/zone 206 that the zoom window 208 is moved by the movement of the cursor 204, the larger the zoom window 208 (and thus the zoom level of the zoom window 208) becomes. That is, the original point/zone 206 is for a specific and limited geographical area, and this limited geographical area is zoomed larger by the movement of cursor 204. Note that in a preferred embodiment this enlargement is NOT caused by dragging a corner or side of the zoom window 208, but rather is only a function of how far the cursor 204 is moved from the original point/zone 206. As shown in FIG. 3, the zoom window 208 is then populated with a zoomed-in view of the original point/zone 206 and becomes zoom window 308. In an alternate embodiment, the amount of zooming can later be adjusted by manually zooming the zoom window 208 in or out to provide more or less detail of the original point/zone 206.

Figure 4:
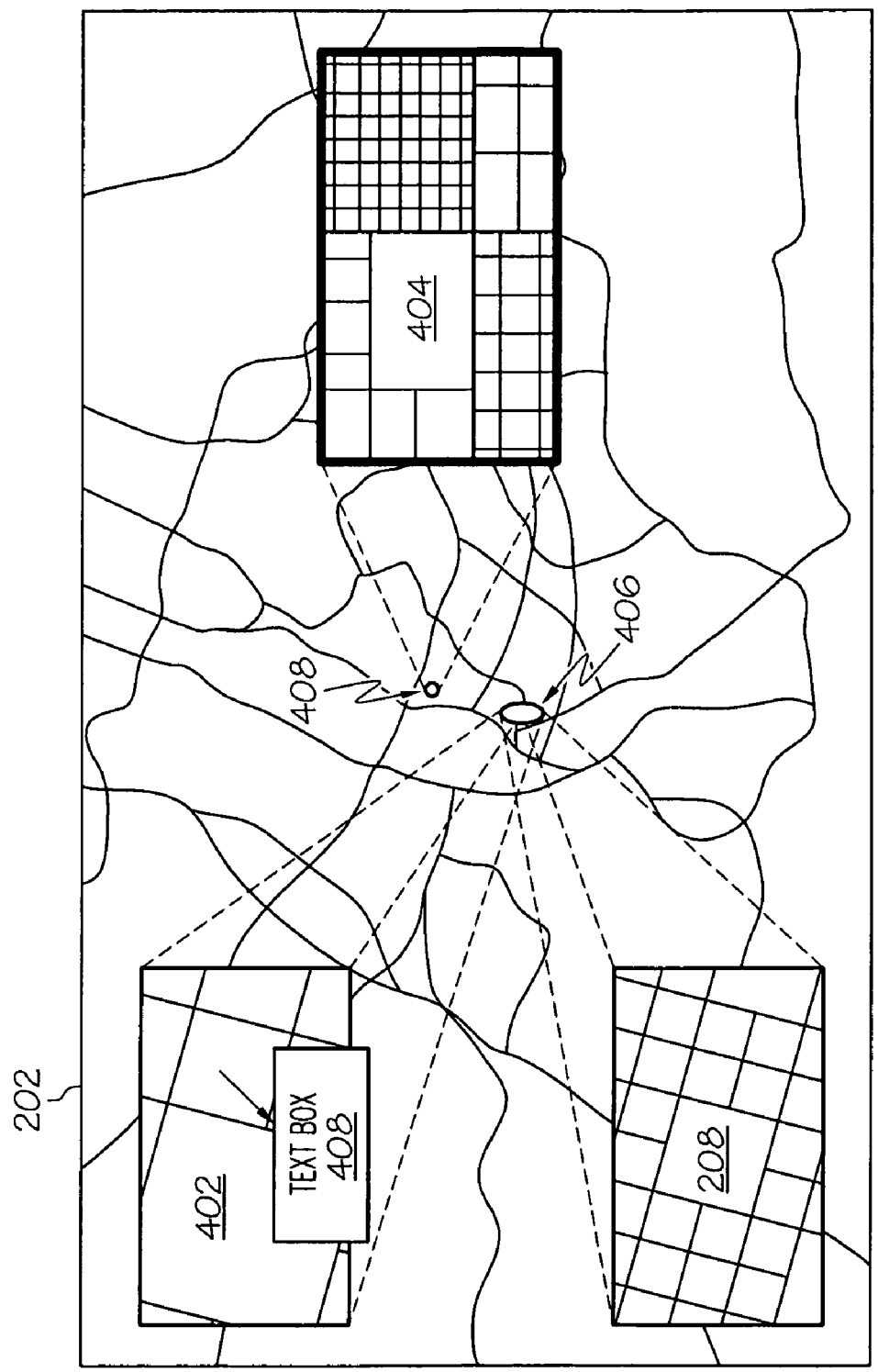
FIG. 4 illustrates multiple user-selected zoom windows simultaneously overlaying the digital map shown in FIG. 3.

With reference now to FIG. 4, the main digital map 202 is shown with multiple persistent zoom windows 208, 402, and 404. Each zoom window remains persistent until the user chooses to remove them by manually entering a command to the computer that is generating the digital map 202 to do so. Note that the different zoom windows may have different zoom-levels, even though they may be initialized from a same or different original point/zone. That is, zoom window 208 and zoom window 402 are zoomed displays of a same original point/zone 406, but are at different zoom levels (e.g., zoom window 402 presents greater detail than zoom window 208 of the same original point/zone 406). Zoom window 404, however, presents only a zoomed view of point/zone 408 from the original digital map 202. In one embodiment, each of the zoom windows 208, 402, and 404 may be manually zoomed in or out after being created by the process described above (by dragging the cursor a distance from an original point/zone).

In one embodiment, logic (e.g., DGMCP 148 shown in FIG. 1) that generates the main digital map and the zoom windows also keeps track of where major intersections/highways are displayed on the main digital map 202. This logic automatically overrides where the cursor positions the zoom window such that the zoom window does not obscure/overlay such intersections/highways. That is, if a zoom window is obscuring such a point of interest (including those needed for navigational purposes), then that zoom window is automatically repositioned such that it does not obscure this point of interest.

Note that the zoom windows depicted in FIGS. 2-4 preferably have tracking lines from each zoom window to the respective point/zone that is being zoomed, thus providing a visual cue as to which zoom window is associated with which point/zone from the initial digital map.

Note that in one embodiment, the zoom windows depicted in FIGS. 2-4 may be shape and/or color coded. For example, consider zoom window 404 shown in FIG. 4. Zoom window 404 has an extra-wide border, indicating some special condition for the zoomed area for point/zone 408. One example of such a special condition is a prohibition against transporting hazardous loads through the area depicted by zoom window 404. That is, many cities have areas in which hazardous materials (flammables, biohazards, etc.) may not be transported. If zoom window 404 displays such a restricted area, the coding (different border, shape, color, etc.) will indicate as such. Other special conditions include school zones, areas of unusually low speed limits, areas defined by a real-time traffic service as having unusual traffic delays, etc.

Continuing with FIG. 4, consider text box 408. Text box 408 is a pop-up box that displays additional text information about map information presented in zoom window 402. For example, assume that zoom window 402 includes a graphical depiction of a recommended travel route. By right-clicking over zoom window 402 (or performing some other input step), a user will be presented with a text description of directions to be taken when driving the depicted route. In another embodiment, a user may place a cursor directly over some point (e.g., a street intersection) within the zoom window 402, and then right-clicking or activating some mnemonic control (e.g., the "Control" key plus the key for the letter "B" on a keyboard) to query what businesses are located at that intersection. Text box 408 then displays the name, address, phone number, etc., as retrieved from a local or remote database, of all businesses that are found at that intersection.

While the present invention describes the zoom windows as being enlarged in direct proportion to the movement of a cursor from an initial point, in one embodiment the zoomed windows can be manually enlarged to display additional information. That is, consider zoom window 208. By dragging a side or corner of zoom window 208, the zoom window 208 remains at its original zoom level, but shows additional information of surrounding areas. That is, additional streets, etc. that were not initially visible within zoom window 208 are now made visible by dragging a side/corner of the zoom window outward, but while retaining the same zoom level of the original zoom window 208.

Figure 5:
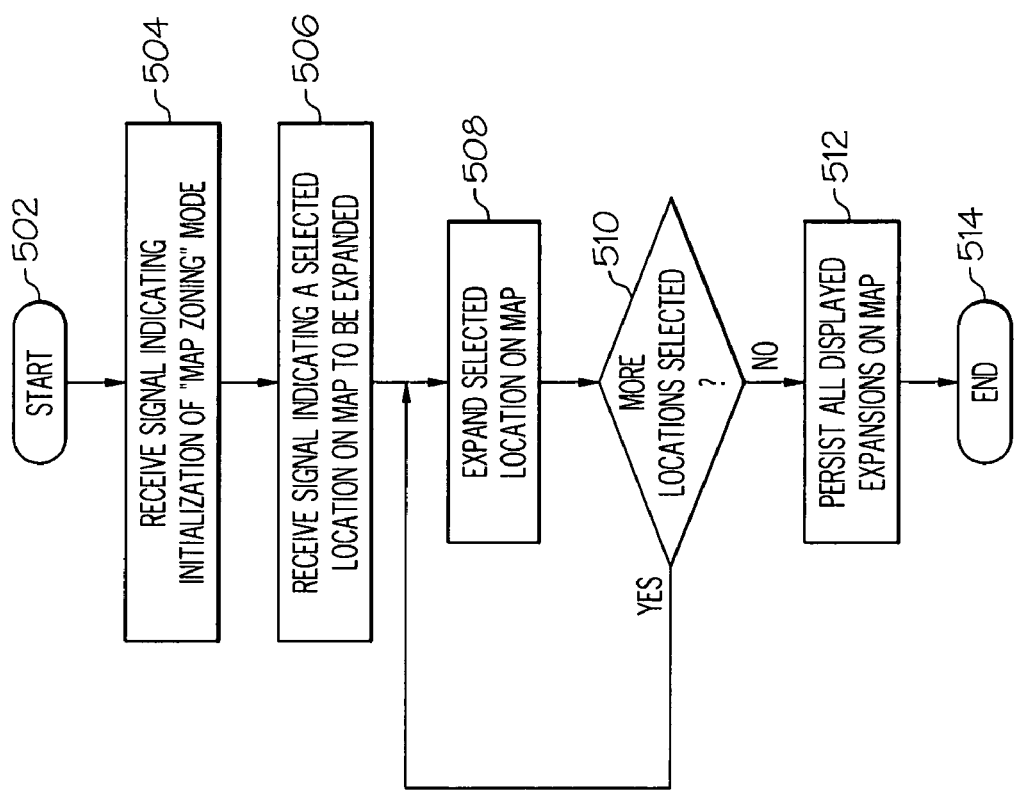
FIG. 5 is a high-level flow-chart of exemplary steps processed by a computer to generate a user-defined digital map having one or more overlaying zoomed windows.

With reference now to FIG. 5, a high-level flow-chart of exemplary steps taken by computer logic to display one or more persistent zoom windows on a digital map is presented. After initiator block 502, a computer processor, executing instructions from DGMCP 148, receives a signal indicating that a user has initialized a "Map Zoning" mode that locks (prevents) map zooming and re-centering of the entire original main digital map (block 504). Once the original main digital map is in the "Map Zoning" mode, a signal can be received by the processor indicating that a specific zone/point on the original main digital map has been selected (block 506). This specific zone/point can be merely a point clicked on by a user, or it may be an intersection of grid lines overlaid on the original digital map. The specific zone/point is then expanded and repositioned by the movement of the cursor in a manner described above (block 508). If more points/zones are to be expanded/zoomed (query block 510), they are so expanded/zoomed as displayed expansions (i.e., as zoom windows) in a persistent manner (block 512). The process ends at terminator block 514.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Furthermore, while the present invention has been explained in the context of a Graphical User Interface that displays persistent zoom windows, it is to be understood that this display can be printed onto a hard copy (e.g., onto paper), thus further representing the persistent nature of the zoom windows described herein.

Having thus described the invention of the present application in detail and by reference to illustrative embodiments thereof, it will be apparent that modifications and variations are possible without departing from the scope of the invention defined in the appended claims.

What is claimed is:

1. A computer hardware logic for displaying a computer-generated geographic map on a video display, the computer hardware logic comprising:
    a receiving logic for detecting an input signal for initiating a map zoning mode for an initial computer-generated geographic map, wherein the map zoning mode prevents zooming of all of the initial computer-generated geographic map;
    a zooming logic for zooming multiple user-selected areas on the initial computer-generated geographic map, wherein said zooming generates a unique zoom window for each of the multiple user-selected areas, wherein each said unique zoom window displays and overlays an enlarged view of a corresponding user-selected area, from the multiple user-selected areas, over the initial computer-generated geographic map, wherein the multiple user-selected areas are each a different singular point on the initial computer-generated geographic map;
    a persistence logic for persistently and simultaneously displaying all of the multiple zoom windows over the initial computer-generated geographic map;
    a cursor movement detection logic, wherein the cursor movement detection logic detects a distance between a user dragging a clicked mouse cursor from a user-selected singular point on the initial computer-generated geographic map to a final resting position of the mouse cursor, wherein the dragged distance automatically determines a size and zoom level of a zoom window;
    a zoom window repositioning logic, wherein the zoom window repositioning logic detects a pre-defined type of information displayed on the initial computer generated geographic map; and automatically repositions the zoom window such that the zoom window does not overlay and obscure the pre-defined type of information displayed on the initial computer-generated geographic man;
    a zoom window visual encoding logic, wherein the zoom window visual encoding logic alters a physical appearance or a shape of a border of the zoom window in accordance with a unique condition of roads depicted within the zoom window; and
    a selective zooming logic for selectively zooming each of the multiple zoom windows to different zoom levels.

2. The computer hardware logic of claim 1, wherein the zoom window is visually associated with the user-selected area by a set of linking lines displayed on the initial computer-generated geographic map.

3. The computer hardware logic of claim 1, wherein the pre-defined type of information comprises names of intersecting roads.

4. The computer hardware logic of claim 1, wherein the pre-defined type of information is a city name.

5. The computer hardware logic of claim 1, wherein the unique condition is a prohibition against transporting hazardous materials on the roads depicted within the zoom window.

6. The computer hardware logic of claim 1, further comprising:
    a text box display logic, wherein the text box display logic causes a presentation of a text box to display text information about businesses located at a street intersection depicted within the zoom window.

7. A tangible computer-readable storage medium on which is encoded a computer program, the computer program comprising computer executable instructions configured for displaying a computer-generated geographic map on a video display by performing the steps of:
    detecting an input signal for initiating a map zoning mode for an initial computer-generated geographic map, wherein the map zoning mode prevents zooming of all of the initial computer-generated geographic map;
    zooming multiple user-selected areas on the initial computer-generated geographic map, wherein said zooming generates a unique zoom window for each of the multiple user-selected areas, wherein each said unique zoom window displays and overlays an enlarged view of a corresponding user-selected area, from the multiple user-selected areas, over the initial computer-generated geographic map, wherein the multiple user-selected areas are each a different singular point on the initial computer-generated geographic map;

displaying persistently and simultaneously all of the multiple zoom windows over the initial computer-generated geographic map;

selecting each of the multiple zoom windows to selectively zoom to different zoom levels;

detecting a distance between the user dragging a clicked mouse cursor from a user-selected singular point on the initial computer-generated geographic map to a final resting position of the mouse cursor, wherein the dragged distance automatically determines a size and zoom level of a zoom window;

repositioning the zoom window when a pre-defined type of information displayed on the initial computer generated geographic map is detected to be obscured by at least one or more zoom windows; and automatically repositioning the at least one or more zoom windows such that the pre-defined type of information displayed on the initial computer-generated geographic map is not obscured by any zoom windows; and altering a physical appearance or a shape of a border of the zoom window in accordance with a unique condition of roads depicted within the zoom window.

8. The tangible computer-readable storage medium of claim 7, wherein the zoom window is visually associated with the user-selected area by a set of linking lines displayed on the initial computer-generated geographic map.

9. A system comprising:
a specific processor;
a display coupled to the specific processor;
a tangible computer-readable storage medium on which are stored computer-executable instructions, wherein the computer-executable instructions, when executed, perform a computer-executed method comprising:

detecting an input signal for initiating a map zoning mode for an initial computer-generated geographic map, wherein the map zoning mode prevents zooming of all of the initial computer-generated geographic map;

zooming multiple user-selected areas on the initial computer-generated geographic map, wherein said zooming generates a unique zoom window for each of the multiple user-selected areas, wherein each said unique zoom window displays and overlays an enlarged view of a corresponding user-selected area, from the multiple user-selected areas, over the initial computer-generated geographic map wherein the multiple user-selected areas are each a different singular point on the initial computer-generated geographic map;

displaying persistently and simultaneously all of the multiple zoom windows over the initial computer-generated geographic map;

selecting each of the multiple zoom windows to selectively zoom to different zoom levels;

detecting a distance between a user dragging a clicked mouse cursor from a user-selected singular point on the initial computer-generated geographic map to a final resting position of the mouse cursor, wherein the dragged distance automatically determines a size and zoom level of a zoom window;

repositioning the zoom window when a pre-defined type of information displayed on the initial computer generated geographic map is detected to be obscured by at least one or more zoom windows; and automatically repositioning the at least one or more zoom windows such that the pre-defined type of information displayed on the initial computer-generated geographic map is not obscured by any zoom windows; and altering a physical appearance or a shape of a border of the zoom window in accordance with a unique condition of roads depicted within the zoom window.

* * * * *